US006957146B1

(12) United States Patent
Taner et al.

(10) Patent No.: US 6,957,146 B1
(45) Date of Patent: Oct. 18, 2005

(54) SYSTEM FOR UTILIZING SEISMIC DATA TO ESTIMATE SUBSURFACE LITHOLOGY

(75) Inventors: M. Turhan Taner, Houston, TX (US); Matthew B. Carr, Houston, TX (US)

(73) Assignee: RDSP I, L.P.

( * ) Notice: Subject to any disclaimer, the term of this patent is extended or adjusted under 35 U.S.C. 154(b) by 0 days.

(21) Appl. No.: 10/035,955

(22) Filed: Dec. 24, 2001

(51) Int. Cl.$^7$ .......................... G06F 19/00; G06F 15/18
(52) U.S. Cl. .......................................... 702/14; 706/20
(58) Field of Search ............................... 702/6, 14, 16; 706/14, 20; 367/73

(56) References Cited

U.S. PATENT DOCUMENTS

| 4,969,130 | A | * | 11/1990 | Wason et al. ................. 367/73 |
| 5,058,034 | A | | 10/1991 | Murphy et al. |
| 5,373,486 | A | * | 12/1994 | Dowla et al. ............... 367/135 |
| 5,424,959 | A | * | 6/1995 | Reyes et al. .................. 702/28 |
| 5,444,619 | A | * | 8/1995 | Hoskins et al. .............. 702/13 |
| 5,490,062 | A | | 2/1996 | Leach et al. |
| 5,519,805 | A | | 5/1996 | King |
| 5,583,825 | A | * | 12/1996 | Carrazzone et al. .......... 367/31 |
| 5,648,937 | A | * | 7/1997 | Campbell ..................... 367/27 |
| 5,691,958 | A | | 11/1997 | Calvert et al. |
| 5,706,194 | A | | 1/1998 | Neff et al. |
| 5,828,981 | A | | 10/1998 | Callender et al. |
| 5,835,883 | A | * | 11/1998 | Neff et al. ..................... 702/7 |
| 5,862,513 | A | | 1/1999 | Mezzatesta et al. |
| 5,940,777 | A | * | 8/1999 | Keskes ......................... 702/16 |
| 6,011,557 | A | | 1/2000 | Keskes et al. |
| 6,295,504 | B1 | * | 9/2001 | Ye et al. ........................ 702/7 |
| 6,374,185 | B1 | * | 4/2002 | Taner et al. ................... 702/6 |
| 6,725,163 | B1 | * | 4/2004 | Trappe et al. ................. 702/9 |
| 6,826,483 | B1 | * | 11/2004 | Anderson et al. ............ 702/13 |

OTHER PUBLICATIONS

"Kohonen's Self Organizing Networks with Conscience", Taner, Rock Solid Images, Nov. 1997.*

(Continued)

*Primary Examiner*—John Barlow
*Assistant Examiner*—Toan M. Le
(74) *Attorney, Agent, or Firm*—E. Eugene Thigpen; Richard A. Fagin

(57) ABSTRACT

A method of geophysical exploration of a subsurface region of interest which utilizes an unsupervised learning network to organize seismic data representing a subsurface region of interest. A portion of the organized seismic data is correlated with lithological data from a well bore located in said subsurface region of interest and said correlation is applied to said seismic data to estimate lithology in said subsurface region of interest.

12 Claims, 18 Drawing Sheets

OTHER PUBLICATIONS

"Modular Artificial Neural Network for Prediction of Petrophysical Properties from Well Log Data", Fung et al., IEEE Transaction on Instrumentation and Measurement, vol. 46, No. 6, Dec. 1997.*

"Calibration of Seismic Attributes for Reservoir Characterization", Pennington et al., Annual Technical Progress Report, Michigan Technological Univ., Oct. 2001.*

M. T. Tanner and F. Koeher and R. E. Sheriff; "Complex Seismic Trace Analysis"; Geophysics; Jun. 1979; pp. 1041-1063; vol. 44, No. 6.

B. Russell, D. Hampson and J. Schuelke and J. Quirein; "Multiattribute Seismic Analysis"; The Leading Edge; Oct. 1997; pp. 1439-1443.

Joel D. Walls and M. Turhan Taner and Tom Guidish and Gareth Taylor and David Dumas and Naum Derzhi; "North Sea Reservoir Characterization using Rock Physics, Seismic Attributes, and Neural Networks: A Cast History"; Annual Meeting Abstracts—Society of Exploration Geophysicists; 1999; pp. 1572-1575.

M. Morice , N. Keskes and F. Jeanjean; "Manual and Automatic Seismic Facies Analysis on SISMAGE™ Workstation"; Annual Meeting Abstracts—Society of Exploration geophysicists; 1996; pp. 320-323.

M. Taner; "Kohonen's self organizing networks with 'Conscience'"; Internet website http://www.rocksolidimages.com; Nov. 1997; pp. 1-7.

* cited by examiner

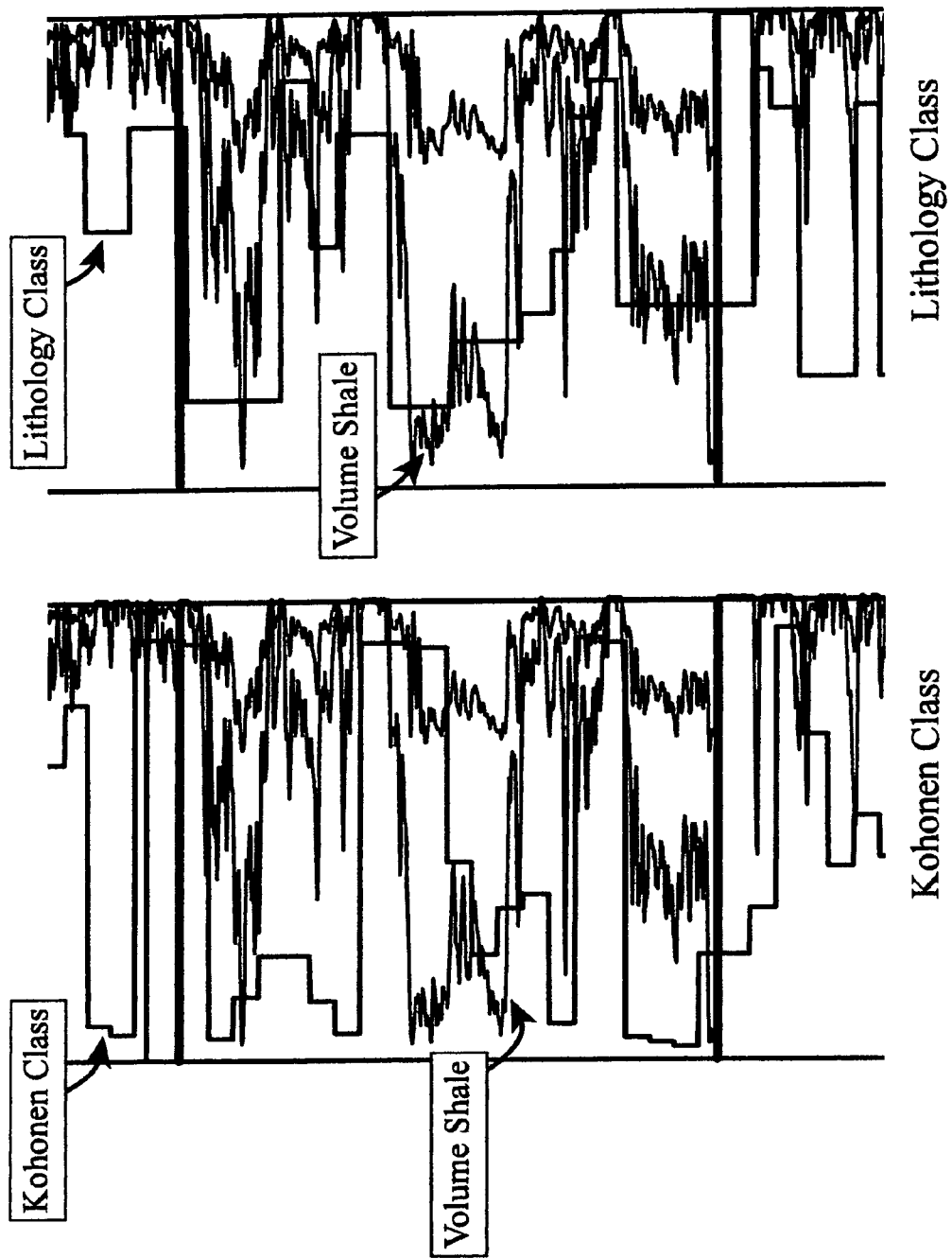

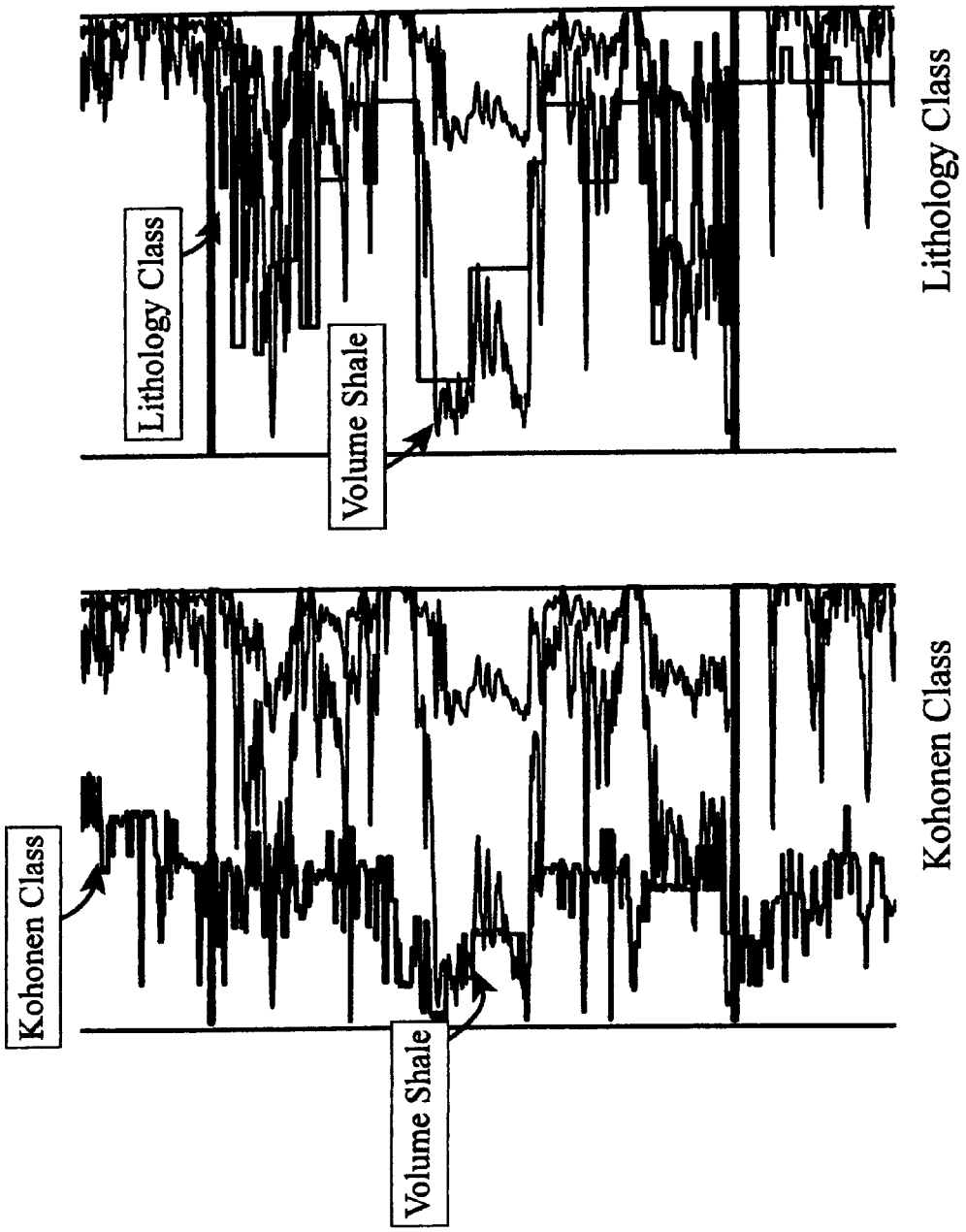

SYSTEM FOR UTILIZING SEISMIC DATA TO ESTIMATE SUBSURFACE LITHOLOGY

BACKGROUND OF THE INVENTION

1. Field of the Invention

This invention is related to the use of well data and seismic data to predict subsurface lithology.

2. Description of Related Art

For many years seismic exploration for oil and gas has been conducted by use of a source of seismic energy and the reception of the energy generated by the source by an array of seismic detectors. On land, the source of seismic energy may be a high explosive charge or another energy source having the capacity to deliver a series of impacts or mechanical vibrations to the earth's surface. Acoustic waves generated by these sources travel downwardly into the earth's subsurface and are reflected back from strata boundaries and reach the surface of the earth at varying intervals of time depending on the distance traveled and the characteristics of the subsurface traversed. These returning waves are detected by the sensors which function to transduce such acoustic waves into representative electrical signals. The detected signals are recorded for later processing using digital computers. Typically an array of sensors is laid out along a line to form a series of detection locations. More recently, seismic surveys are conducted with sensors and sources laid out in generally rectangular grids covering an area of interest, rather than along a single line, to enable construction of three dimensional views of reflector positions over wide areas. Normally, signals from sensors located at varying distances from the source are added together during processing to produce "stacked" seismic traces. In marine seismic surveys, the source of seismic energy is typically air guns. Marine seismic surveys typically employ a plurality of sources and/or a plurality of streamer cables, in which seismic sensors are mounted, to gather three dimensional data.

In 1979, Taner et al. published the work "Complex Seismic Trace Analysis", Geophysics, Volume 44, pp. 1041–1063, and exploration geophysicists have subsequently developed a plurality of time-series transformations of seismic traces to obtain a variety of characteristics that describe the traces, which are generally referred to as "attributes". Attributes may be computed prestack or poststack. Poststack attributes include reflection intensity, instantaneous frequency, reflection heterogeneity, acoustic impedance, velocity, dip, depth and azimuth. Prestack attributes include moveout parameters such as amplitude-versus-offset (AVO), and interval and average velocities.

It has been observed that specific seismic attributes are related to specific subsurface properties. For example, acoustic impedance may be related to porosity. Other subsurface properties appear to be related to other seismic attributes, but it may be unclear what the relationship is, as local factors may affect the data in unexpected ways.

Frequently, both well logging data and seismic data are available for a region of the earth which includes a subsurface region of interest. Core data may also be available. Typically, the well log data and, if available, the core data, are utilized for constructing a detailed log of subsurface properties at the location of the well bore. The seismic data, which include data gathered in the interwell region of interest, are then utilized to estimate the structure of the subsurface formation extending between well locations. Subsurface formation property mapping, however, is typically based solely on the wireline log and core sample data.

More recently however, a number of proposals have been made for using seismic data gathered from the interwell region to improve the estimation of formation properties in the interwell region. See for example, U.S. Pat. Nos. 5,444, 619; 5,691,958; 5,706,194; 5,940,777 and 5,828,981.

The past few years has seen the introduction of several methods which attempt to classify surface seismic information via the use of artificial neural networks. Some of these methods also use borehole data to further constrain this classification. See, for example, U.S. Pat. Nos. 5,444,619; 5,691,958; 5,706,194; 5,940,777 and 5,706,194.

B. Russell, D. Hampson,. J. Schvelke et al. & J. Quirein, *Multiattribute Seismic Analysis*, The Leading Edge, October, 1997, pp 1439–1443 describes a method for seismic analysis which makes use of artificial neural networks (ANN) to predict log-curves from multiple sets of seismic attributes.

A method for training a neural network using model-driven seismic attributes was presented in J. Walls, N. Derzhi, D. Dumas, T. Guidish, M. Taner and G. Taylor, *North Sea Reservoir Characteistics using Rock Physics, Seismic Attributes, and Neural Networks: A Case History*, Annual Meeting Abstracts, Society of Exploration Geophysicists, pp. 1572–1575 (1999). This trained network is then applied to surface seismic for lithology classification.

M. Morice, N. Keskes and F. Jganjean, F., *Manual and Automatic Seismic Facies Analysis on SISMAGE™ Workstation*, Annual Meeting Abstracts, Society of Exploration Geophysicists, p 320–323 (1996) describe a method for using Kohonen self organizing maps for seismic facies analysis of seismic data.

It was disclosed in M. Taner, *Kohonen's Self Organizing Networks with "Conscience"*, published on the Internet at http://www.rocksolidimages.com in 1997 that Kohonen self organizing maps allow for the classification of seismic data based upon the discriminating ability of one or more sets of representative derived attributes. Although Kohonen self organizing maps have been found to be effective tools for defining seismic classes or facies, it has proven difficult to calibrate the resulting classification with borehole data.

The use of Kohonen self organizing maps in connection with seismic exploration or investigations is also disclosed in U.S. Pat. Nos. 6,011,557; 5,940,777; 5,862,513; 5,519, 805; 5,490,062; 5,373,486 and 5,058,034.

A need continues to exist, however, for an improved method for utilizing seismic data to estimate lithological characteristics of the earth's subsurface.

It should be noted that the description of the invention which follows should not be construed as limiting the invention to the examples and preferred embodiments shown and descried. Those skilled in the art to which this invention pertains will be able to devise variations of this invention within the scope of the appended claims.

SUMMARY OF THE INVENTION

In one embodiment the invention comprises a method of geophysical exploration of a subsurface region of interest which utilizes an unsupervised learning network to organize seismic data representing a subsurface region of interest. A portion of the organized seismic data is correlated with lithological data from a well bore located in said subsurface region of interest and said correlation is applied to said seismic data to estimate lithology in said subsurface region of interest.

In a further embodiment the invention comprises method of geophysical exploration of a subsurface region of interest in which a plurality of seismic data attributes for measurement location from a seismic data set from a subsurface region of interest are applied to a Kohonen network to organize the seismic data set into a plurality of seismic Kohonen classes. A subset of the organized seismic data set representative of the earth's subsurface in the vicinity of a well bore penetrating said subsurface region of interest is selected and Kohonen classes of said subset of said organized seismic data set are correlated with classes of lithological data from said well bore to generate a correlation between Kohonen classes and lithological classes. The correlation is then applied to the seismic data set to estimate lithology of said measurement locations.

BRIEF DESCRIPTION OF THE DRAWINGS

FIG. 8A is a plot of seismic Kohonen class and volume shale.

FIG. 8B is a plot of lithology class and volume shale.

FIG. 12A is a plot of well data Kohonen class and volume shale.

FIG. 12B is a plot of lithology class and volume shale.

DESCRIPTION OF PREFERRED EMBODIMENTS

Figure 1:
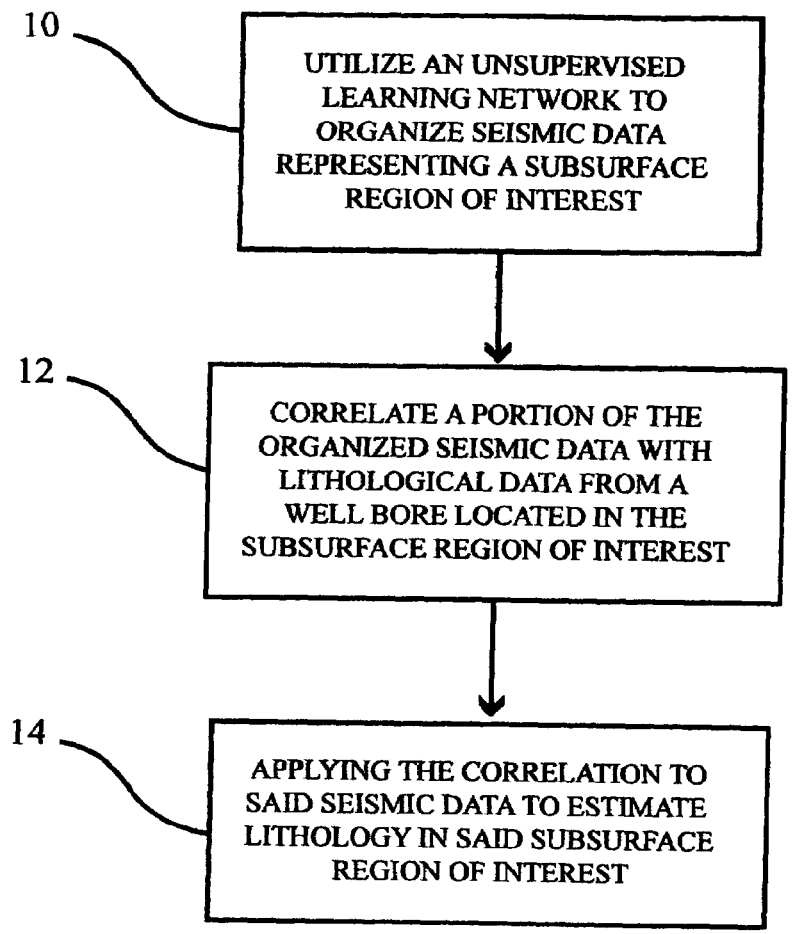
FIG. 1 is a flow chart illustrating a preferred embodiment of the invention.

In a preferred embodiment of the invention, with reference to FIG. 1, in step 10, an unsupervised learning network is utilized to organize seismic data representing a subsurface region of interest. In step 12, a correlation is established between lithological data from a well bore located in the subsurface region of interest and the portion of the organized seismic data. In step 14, this correlation is then applied to the seismic data as organized by the unsupervised learning network to develop lithology estimates for the subsurface region of interest. In a particular implementation of the invention the unsupervised learning network is a self organizing feature map ("SOM"). In a particular implementation the self organizing feature map may be a Kohonen network. Preferred embodiments of the invention described herein will be described with reference to a Kohonen network, although the invention is not limited to use of a Kohonen network.

Typically, when logging measurements are made in a borehole, several tools are utilized for making different measurements during the well logging operation. Each tool output is a representation of the subsurface formation surrounding the borehole. Data which are typically available from the well log measurements, and which may typically be utilized in implementing the invention, include interpreted volume shale curve (obtained from spontaneous potential (SP), gamma ray (GR), neutron porosity (NPHI), bulk density ($\rho_B$) and/or Photoelectric effect (PE) measurements), deep resistivity, density, compressional velocity, shear velocity, and interpreted water saturation curve.

Seismic attributes are representations of the subsurface derived from seismic measurements. Typically these seismic measurements are surface seismic measurements. Seismic attributes are typically derived by applying algorithms known to those of ordinary skill in the art to the seismic data. Specific seismic attributes may be determined to be sensitive to subsurface formations in given areas. In regions of the Gulf of Mexico, semblance, amplitude-versus-offset and attenuation have been found to be sensitive to subsurface formations. Other attributes which may be useful include but are not limited to frequency, phase and relative acoustic impedance.

In accordance with the present invention, the Kohonen self organizing map is first trained on a sub-set of a full seismic attribute data set to determine the relationship between attribute values and lithological classes. Once this relationship has been established, the resulting training data is used to classify the full data-set.

The first embodiment and the second embodiment of the invention as described herein differ only in the process of developing the correlation between the seismic Kohonen classes and the lithology classes.

Figure 2:
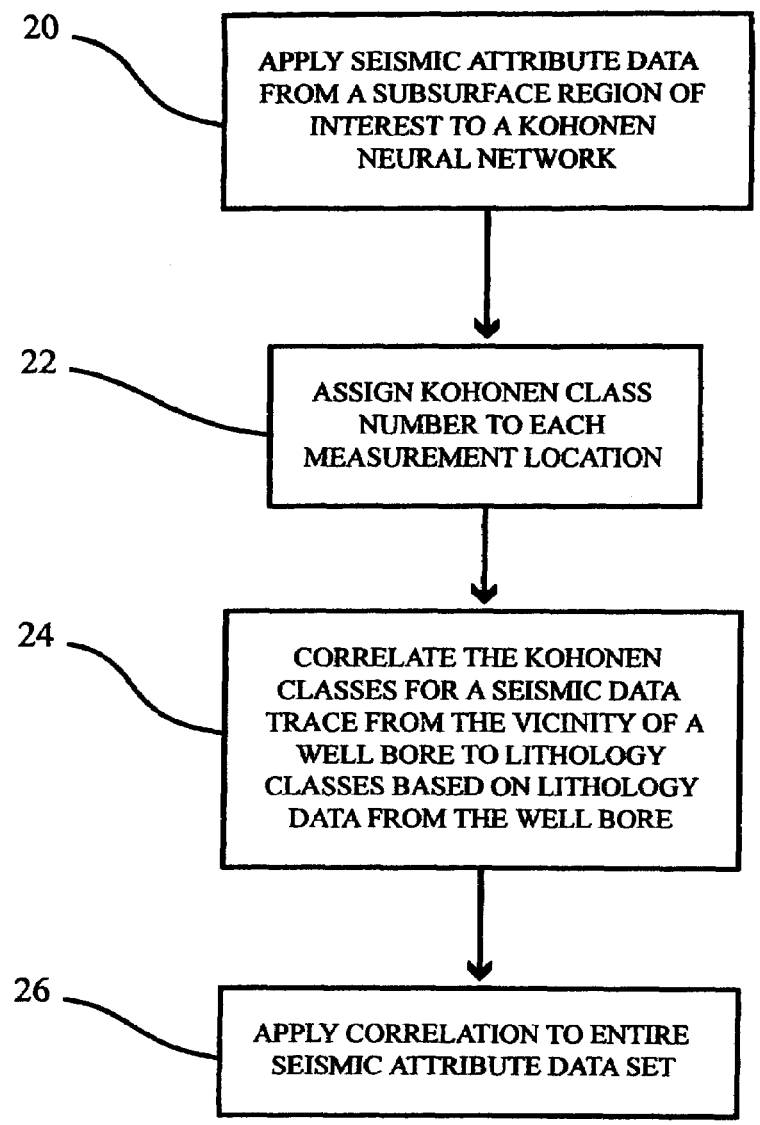
FIG. 2 is a flow chart illustrating a further embodiment of the invention.
Figure 3:
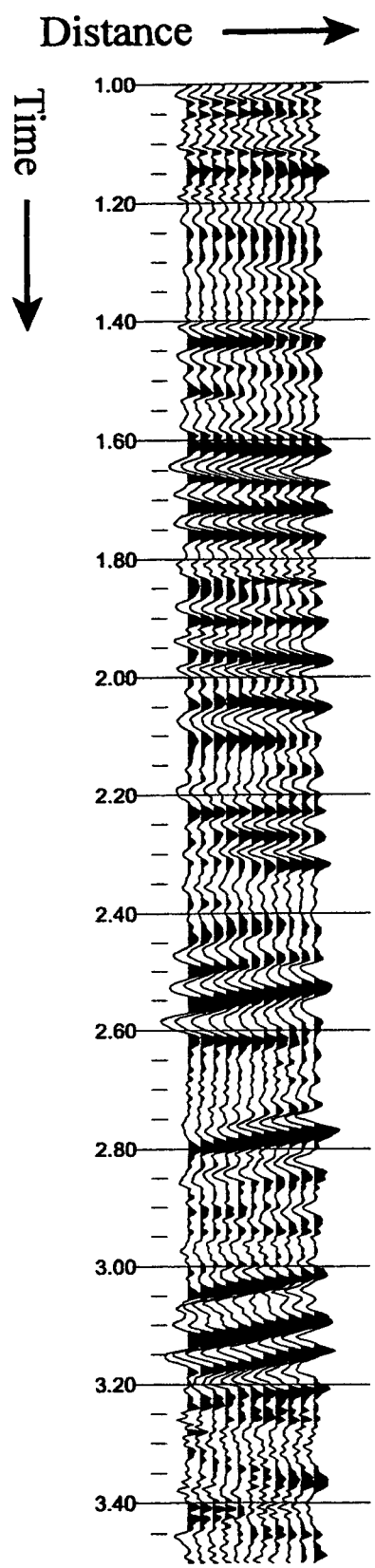
FIG. 3 shows typical seismic data traces.

In the first and second embodiments of the invention described herein, seismic attribute data from the subsurface region of interest are applied to a Kohonen neural network. The first embodiment of the invention is illustrated in FIG. 2, which shows in step 20 that seismic attribute data from a subsurface region of interest is applied to a Kohonen neural network. This seismic attribute data are calculated from recorded seismic data traces, such as the seismic data traces illustrated in FIG. 3. These seismic attributes could be, for example, amplitude, instantaneous frequency or instantaneous phase. Those of ordinary skill in the art will understand, however, that other seismic attributes may be utilized, and that other seismic attributes may more effectively characterize the subsurface formation in different regions of the earth.

Seismic data measurements are typically made at time intervals of 1 to 4 milliseconds. The seismic attribute data, which will include a plurality of seismic attributes at each measurement location, will represent a point in n-dimensional space. In step 22, a seismic Kohonen class number is assigned to each measurement location The Kohonen neural network positions a selected number (quantity) of nodes within this n-dimensional space at positions to achieve the best clustering of the seismic data measurement locations about the node positions. The number (quantity) of nodes is supplied to the network, which may be 100 nodes, and which may be regarded as a 10×10 matrix. The Kohonen neural network positions the 100 nodes within the n-dimensional space at positions that achieve the best clustering of the data positions into 100 clusters. The node number that each measurement location is closest to is then assigned to the measurement location. This node number will be referred to as the seismic data Kohonen class number. The number of nodes and their topology are pre-determined, chosen to maintain maximum unbiased contrast of the data. This means each node will receive a similar total amount of data.

In order to calibrate the Kohonen classes to lithology classes, in step 24, the Kohonen classes for a seismic data trace from the vicinity of a well bore within the subsurface region of interest is correlated to lithology classes based on lithology data from this well bore. Typically, the number of lithology classes will be fewer than the number of Kohonen classes.

The chosen lithology classes may be a function of acoustic impedance and volume shale. If acoustic impedance is divided into four groups which may be, for example, low, medium low, medium high and high, and volume shale is divided into three groups, which may be low, medium and high, a total of twelve lithology classes is developed as follows:

low acoustic impedance-low volume shale
low acoustic impedance-medium volume shale
low acoustic impedance-high volume shale
medium low acoustic impedance-low volume shale
medium low acoustic impedance-medium volume shale
medium low acoustic impedance-high volume shale
medium high acoustic impedance-low volume shale
medium high acoustic impedance-medium volume shale
medium high acoustic impedance-high volume shale
high acoustic impedance-low volume shale
high acoustic impedance-medium volume shale
high acoustic impedance-high volume shale Acoustic impedance (AI) is equal to the product of compressional sonic velocity (Vp) and bulk density ($\rho_B$).

$$AI = (Vp)(\rho_B) \tag{Eq. 1}$$

Volume shale can be derived according to several relationships known to those of ordinary skill in the art from measurements of spontaneous potential (SP), gamma ray (GR), neutron porosity (NPHI), bulk density ($\rho_B$) and/or Photoelectric effect (PE). For example, a linear relationship between gamma ray (GR) value and shale may be utilized. That is, the gamma ray value for shale is about 105, while the gamma ray value for clean sand is about 10, and the volume shale at any well bore location is linearly related to value of the measured gamma ray value at that well bore location as follows:

$$V_{shale} = \frac{GR_{log} - GR_{clean}}{GR_{shale} - GR_{clean}} \tag{Eq. 2}$$

in which $V_{shale}$=volume shale, $GR_{log}$ = measured value of gamma rays at the well bore location,
$GR_{shale}$ = gamma ray value for 100% shale (i.e., 105)
$GR_{clean}$ = gamma ray value for 0% shale (i.e., 10).

Those of ordinary skill in the art will recognize that a region of high volume shale is shale, a region of medium volume shale is silt and that a region of low volume shale is sand. Other well data, other than acoustic impedance and interpreted volume shale, may also be utilized to define lithology classes, such as total porosity and volume shale, or water saturation and volume shale.

Figure 4:
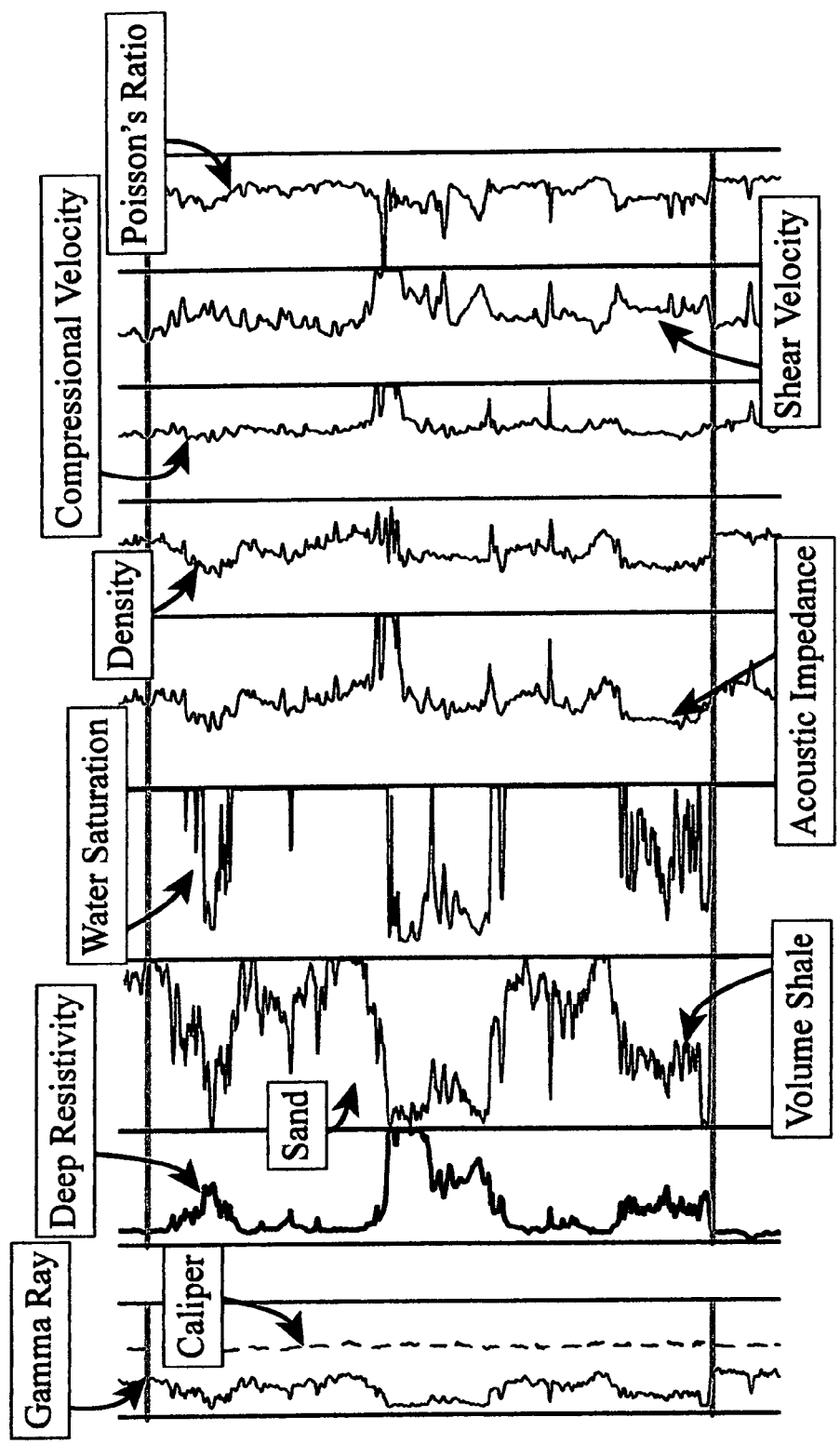
FIG. 4 illustrates typical well data.
Figure 5:
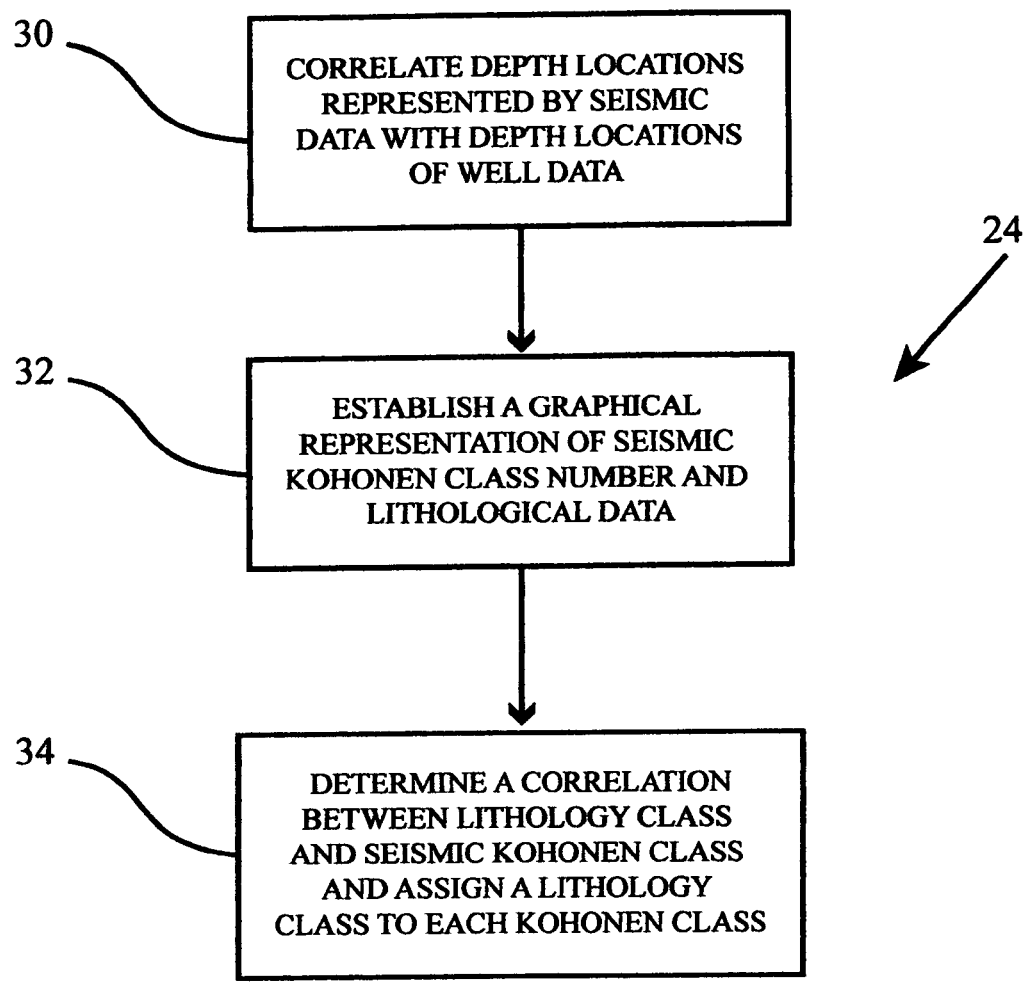
FIG. 5 is a flow chart showing the performance of step 24 in more detail.
Figure 6:
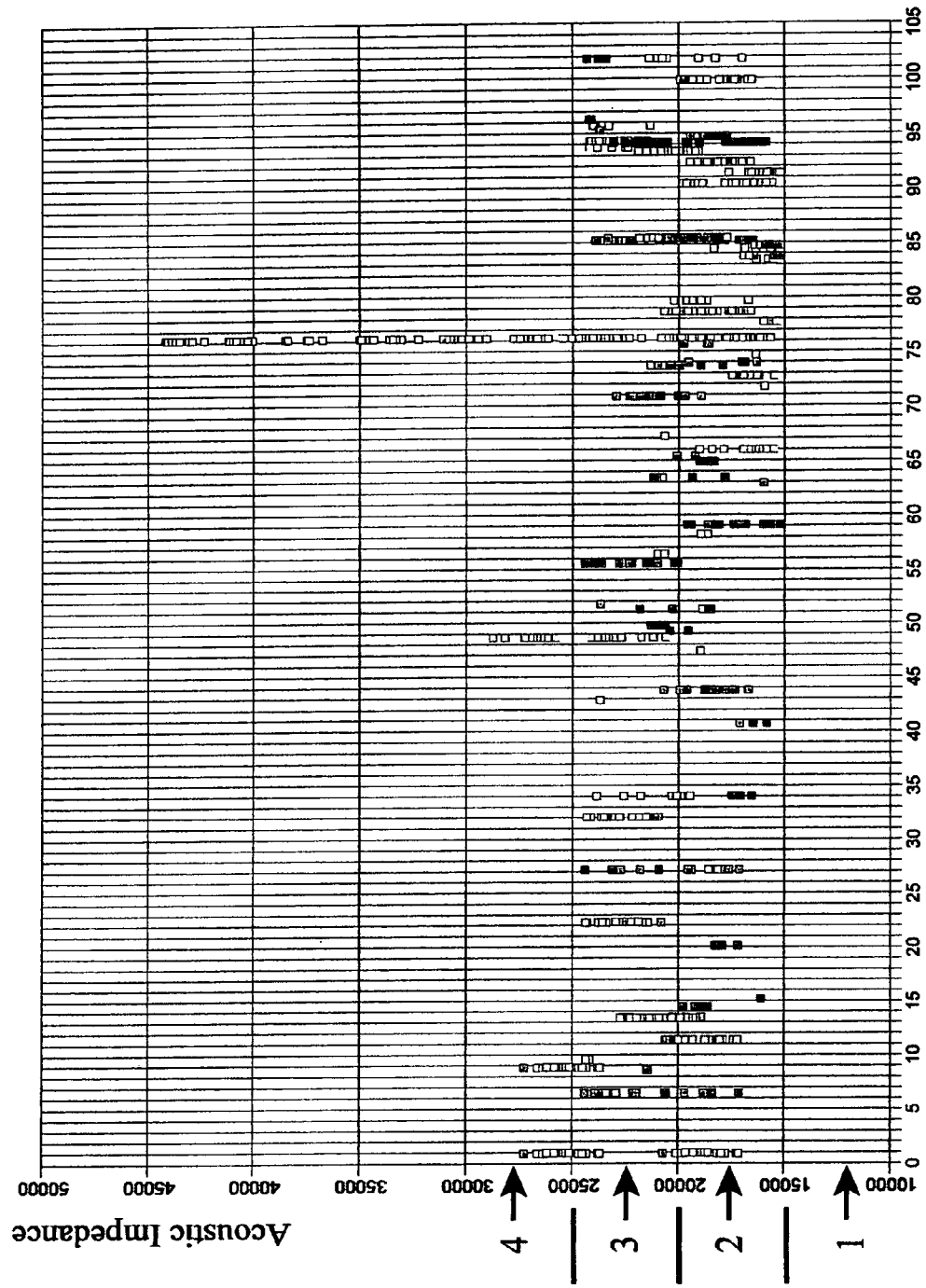
FIG. 6 is a plot show the relation between Kohonen class and acoustic impedance for seismic attribute data.

FIG. 4 illustrates data from a well, including volume shale and acoustic impedance. Note that volume shale and sand are indicated by the same plot. As volume shale increases, sand decreases and vice versa. Steps for performing step 24 are shown in more detail in FIG. 5. In order to correlate the seismic Kohonen classes to lithology classes, in step 30, the depth locations represented by the seismic data are correlated with depth locations of the well data. In step 32, the correlation of the Kohonen classes to lithology classes may be performed by establishing a graphical representation of seismic Kohonen class number and lithological data. In a particular implementation, a graphical representation is established in which the ordinate represents Kohonen class numbers and the abscissa represent acoustic impedance. For each seismic attribute data location, the value of acoustic impedance at the corresponding well bore location is ascertained and a graphical representation is made for corresponding values of Kohonen class and acoustic impedance. FIG. 6 shows a plot of the relation between Kohonen class and acoustic impedance from a portion of a well bore in which the values of all data points, irrespective of the value for volume shale at that location, are plotted. The plot in FIG. 6 does not distinguish between values of volume shale for the plotted data locations.

In order to correlate the Kohonen classes to the twelve lithology classes referred to above, the shale volume (e.g., whether low, medium or high) for each data measurement location is indicated on the plot of that data measurement location. In one implementation of the invention, illustrated in FIGS. 7A, 7B and 7C, three separate plots are utilized in which low volume shale data locations are plotted on a first plot shown in FIG. 7A, medium volume shale data locations are plotted on a second plot shown in FIG. 7B and high volume shale data locations are plotted on a third plot shown in FIG. 7C. In another implementation all data locations may be plotted on the same plot and different colors used to indicate whether the measurement location is a low, medium or high volume shale location.

The plot (or plots) is then subdivided into regions of high, medium high, medium low and low values of acoustic impedance, such as indicated on FIG. 6, in which region 1 is low acoustic impedance, region 2 is medium low acoustic impedance, region 3 is medium high acoustic impedance and region 4 is high acoustic impedance. In step 34, it is then determined, either visually, or by numerical calculation, in which of the lithology classes each of the seismic Kohonen class data points is predominantly located, and each of the Kohonen classes is assigned a corresponding lithology class as so determined. FIG. 8A shows a plot of seismic Kohonen classes in conjunction with a plot of volume shale. FIG. 8B shows a plot of the resulting 12 lithology classes plotted in conjunction with a plot of volume shale. Such plots may assist the analyst in rejecting data locations which appear to be noisy and improve the assignment of Kohonen classes to lithology classes.

After the correlation is established between Kohonen classes and the lithology classes by use of the training set of seismic attribute data from the seismic trace (or traces) recorded at the location of the well bore, in step 26, this correlation may be applied to the entire seismic attribute data set. Accordingly, a lithology class may be assigned to each data location of the seismic data, and the result may be displayed or plotted or both. Typically each of the separate lithology classes will be shown as a different color on a display or plot.

The second embodiment of the invention is similar to the first embodiment, except that well data are utilized for establishing more precisely the boundaries for high, medium high, medium low and low acoustic impedance.

Figure 9:
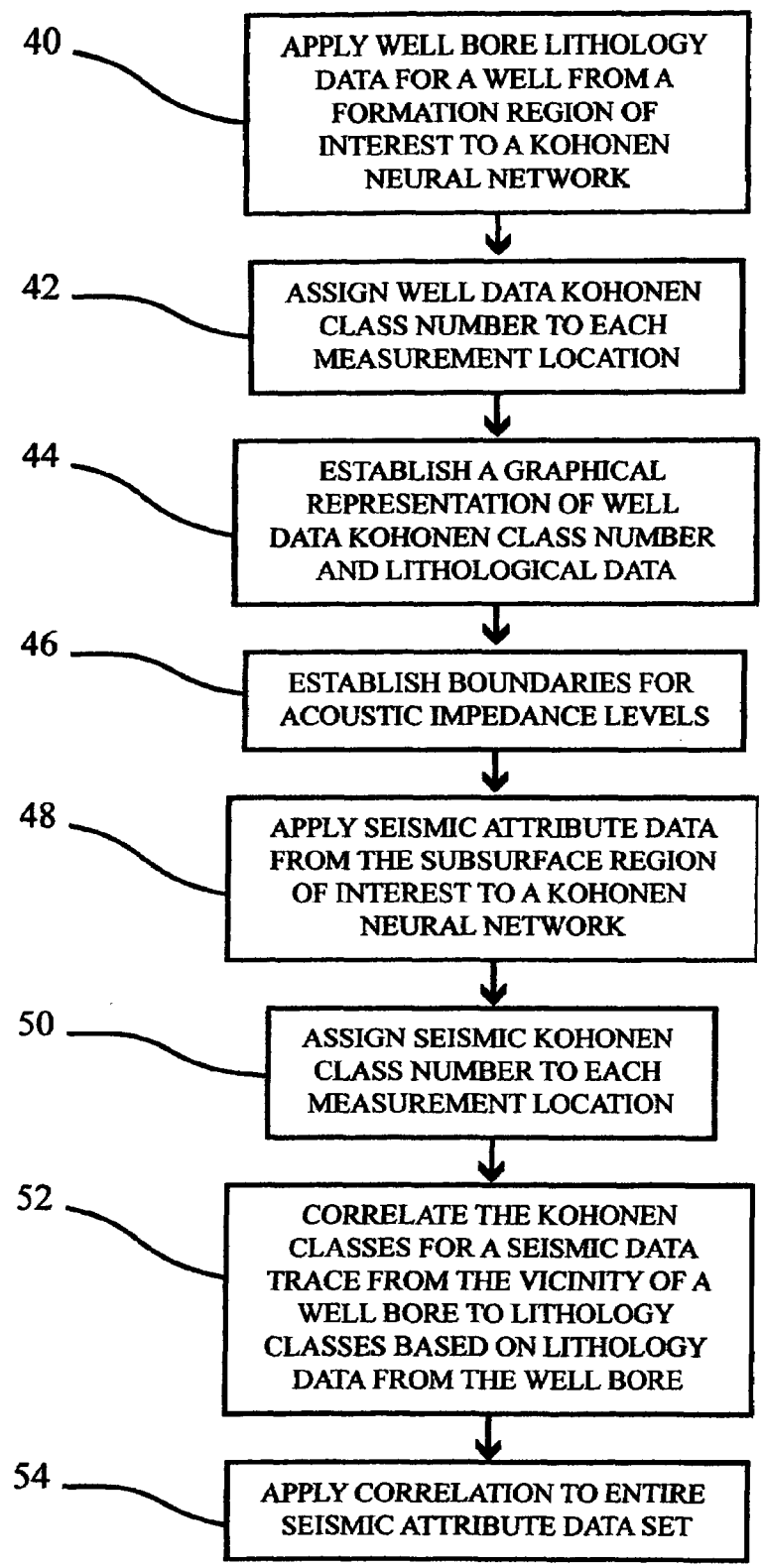
FIG. 9 is a flow diagram illustrating another embodiment of the invention.

To assist in assigning the boundaries for low, medium low, medium high and high acoustic impedance, well data Kohonen classes are developed and correlated to lithology classes. In this second embodiment, as illustrated in FIG. 9, in step 40 a selected plurality of types of well bore lithology data from the well or wells for which the lithological data are available for the formation region of interest are applied to a Kohonen neural network to train the network. This well data could be, for example, deep resistivity, sonic, density or gamma ray data. However, other well data may be utilized, and different well data may more effectively characterize the subsurface formation in different regions of the earth.

Well measurements are typically made in a well bore at intervals of 0.5 feet, although this interval may vary for different wells. As discussed previously with respect to seismic attribute data, the well data at each measurement location will represent a point in n-dimensional space. In step 42, a well data Kohonen class number is assigned to each measurement location. The Kohonen neural network positions a selected number (quantity) of nodes within this n-dimensional space at positions to achieve maximum clustering of the data measurement locations about the node positions. The number (quantity) of nodes is supplied to the network, which may be 100 nodes and which may be regarded as a 10×10 matrix. The Kohonen neural network positions the 100 nodes within the n-dimensional space at positions that achieve the best clustering of the data points into 100 clusters. The node number that each measurement location is closest to is then assigned to the measurement location. The number of nodes and their topology are pre-determined, chosen to maintain maximum unbiased contrast of the data. This means each node will receive a similar total amount of data.

Figure 10:
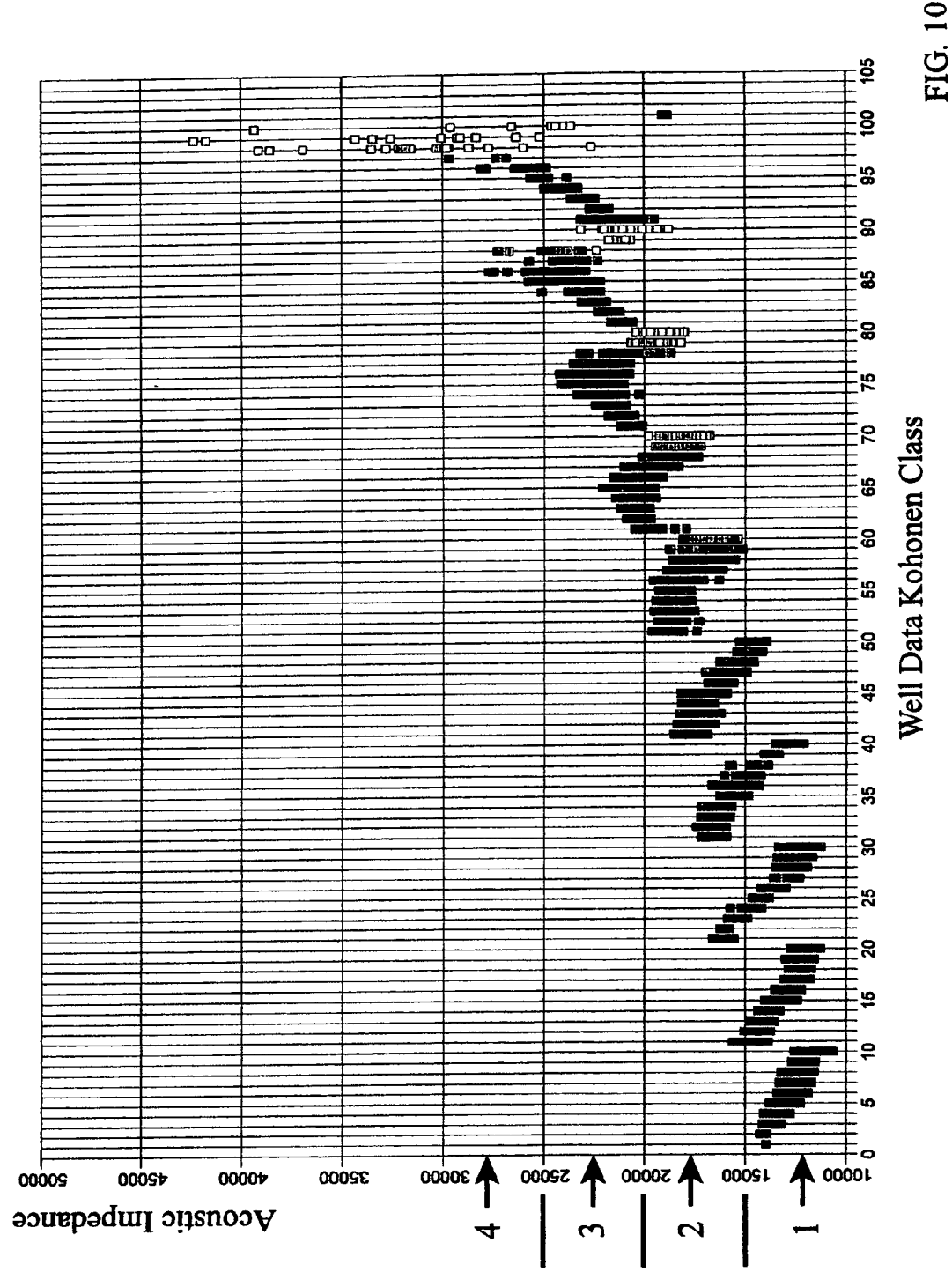
FIG. 10 is a plot show the relation between Kohonen class and acoustic impedance for well data.

Establishing the boundaries for high, medium high, medium low and low acoustic impedance may be performed in step 44, by establishing a graphical relationship of well data Kohonen class number and lithological data. In a particular implementation, a graphical representation is established in which the ordinate represents well data Kohonen class numbers and the abscissa represents acoustic impedance. For each well location for which data are applied to the Kohonen network, the value of acoustic impedance at that well bore location is ascertained and a graphical representation is made for corresponding values of Kohonen class and acoustic impedance. FIG. 10 shows a plot of the relation between well data Kohonen class and acoustic impedance for a portion of a well bore in which the values of all data points, irrespective of the value for volume shale at that location, is plotted.

Figure 11A:
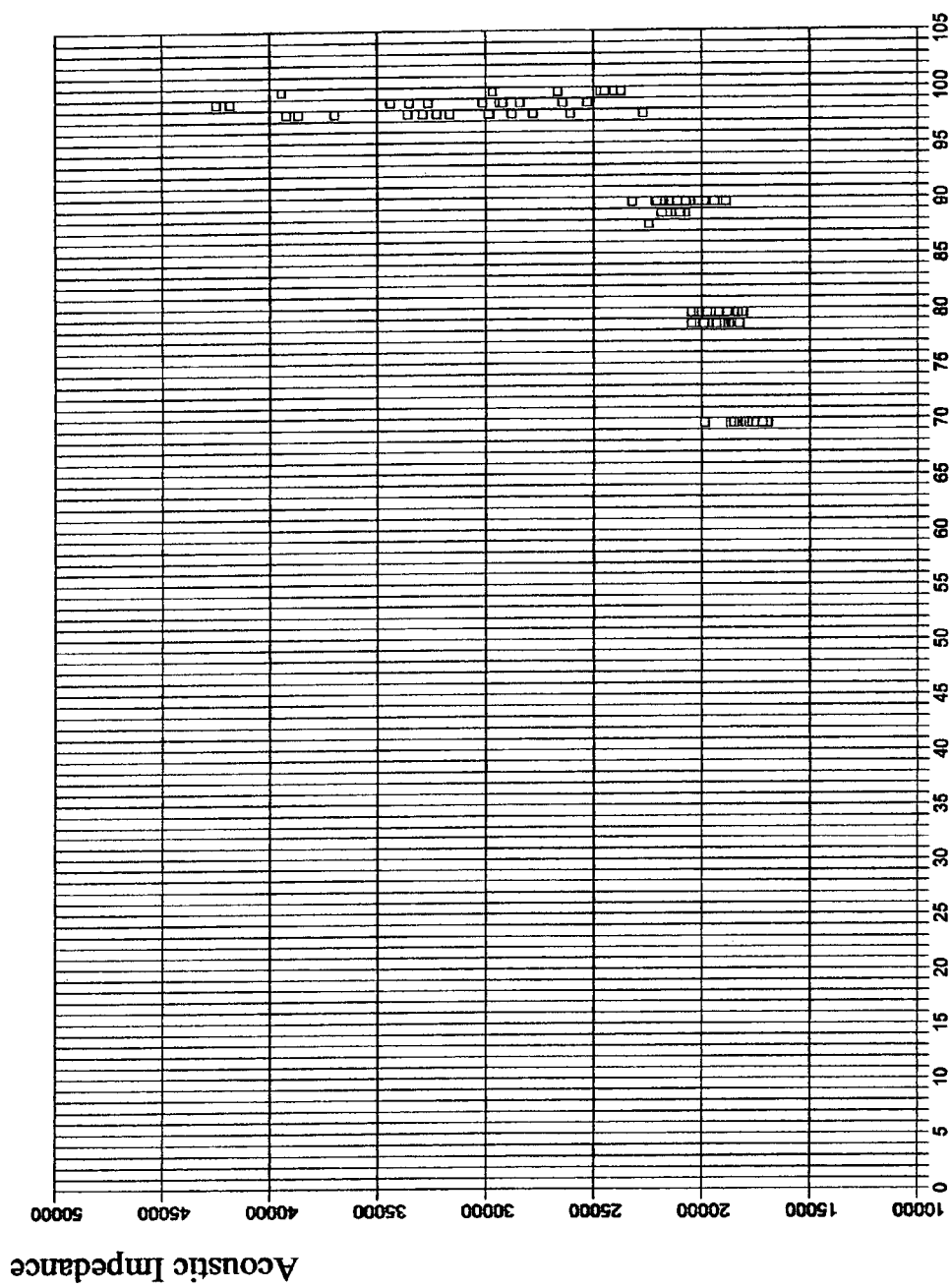
FIGS. 11A, 11B and 11C are plots showing the relation between well data Kohonen class and acoustic impedance for low volume shale, medium volume shale and high volume shale, respectively.
Figure 11B:
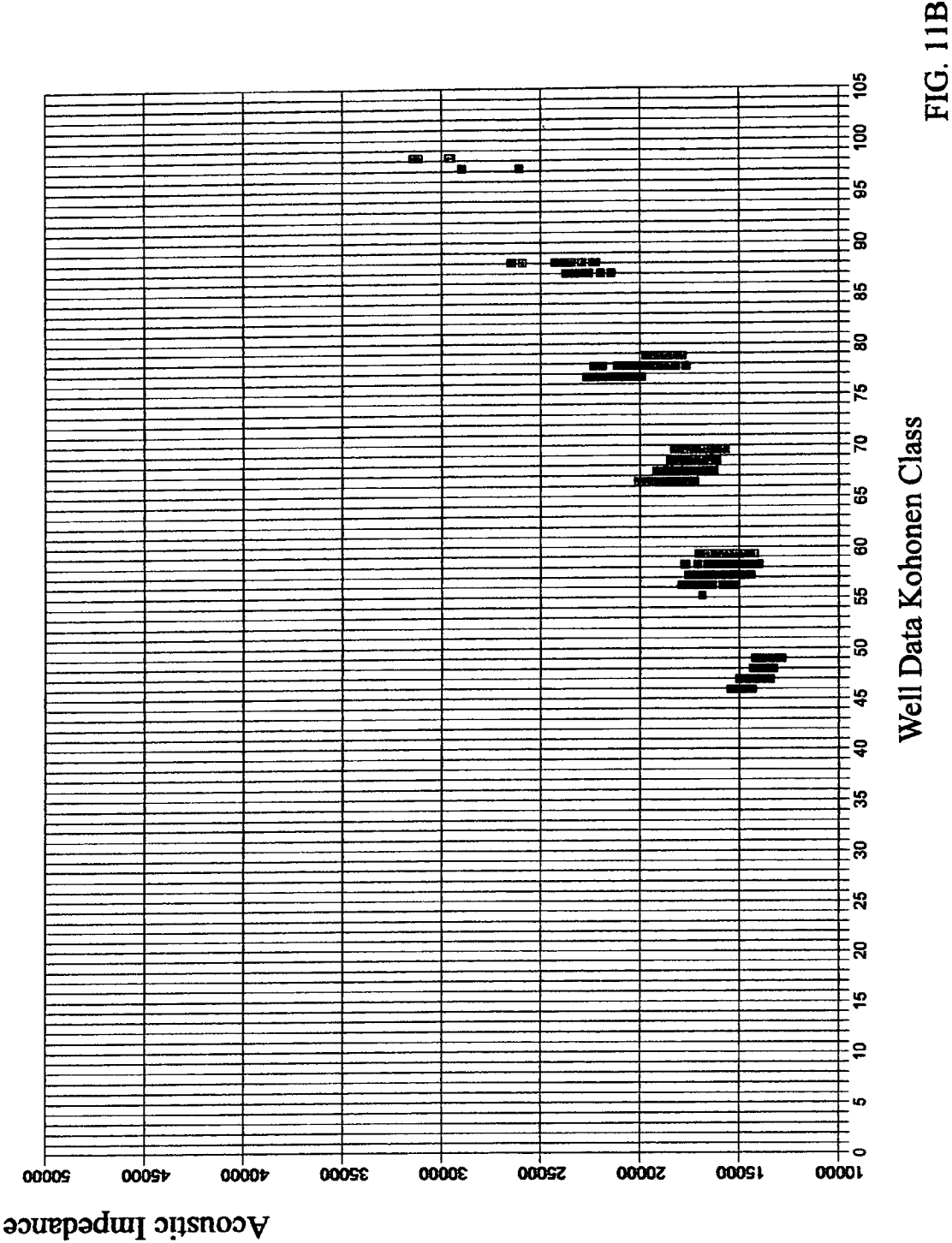
Figure 11C:
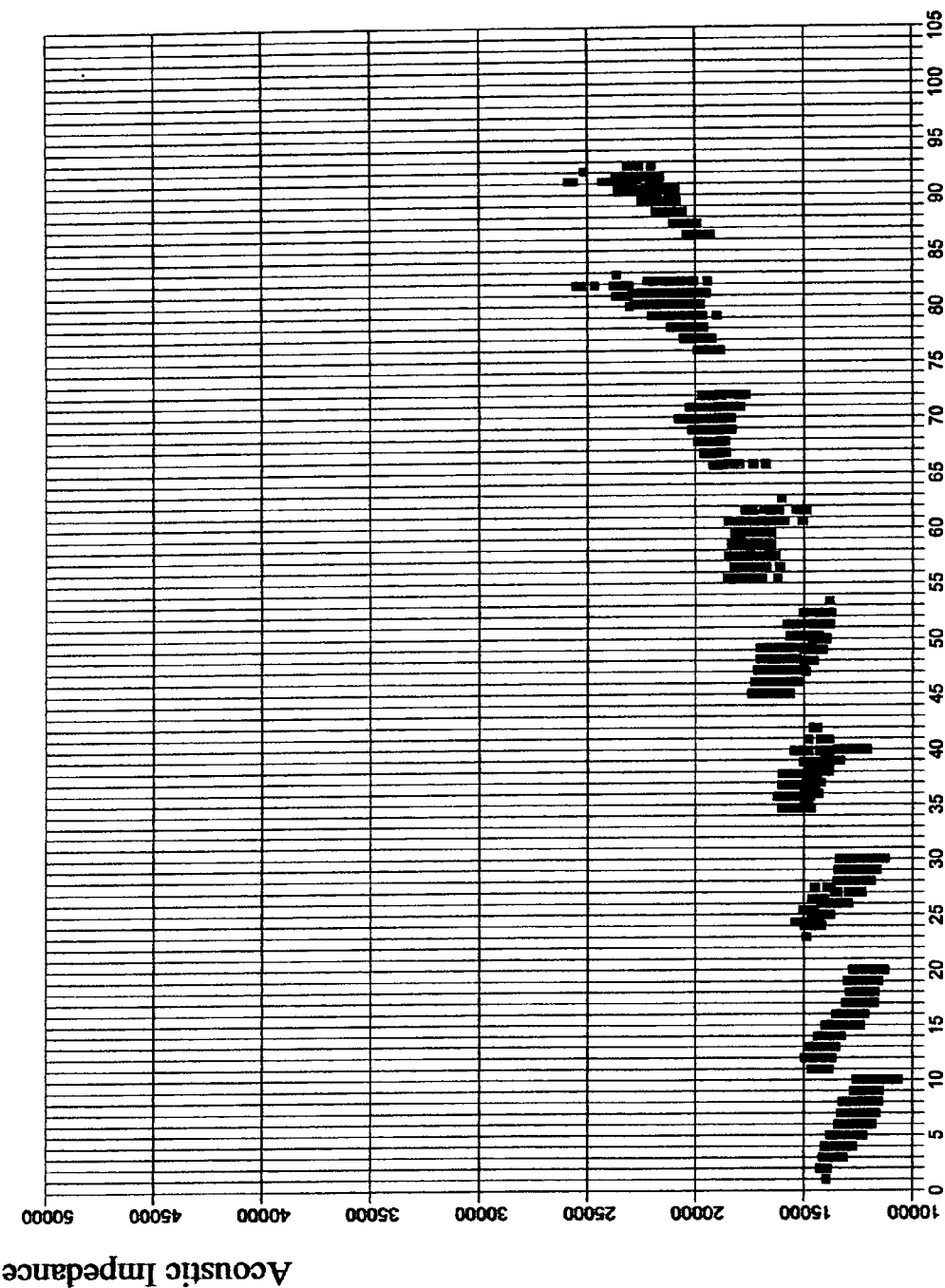

To correlate the well data Kohonen classes to the lithology classes referred to above, the shale volume (e.g., whether low, medium or high) for each data measurement location is indicated on the plot of that data measurement location. In one implementation of the invention, illustrated in FIGS. 11A, 11B and 11C, three separate plots are utilized in which low volume shale data locations are plotted on a first plot shown in FIG. 11A, medium volume shale data locations are plotted on a second plot shown in FIG. 11B and high volume shale data locations are plotted on a third plot shown in FIG. 11C. In another implementation all data locations may be plotted on the same plot and different colors are used to indicate whether the measurement location was a low, medium or high volume shale location.

In step 46, to establish boundaries for acoustic impedance levels, the plot (or plots) is then subdivided into regions of high, medium high, medium low and low values of acoustic impedance, such as indicated on FIG. 10, in which region 1 is low acoustic impedance, region 2 is medium low acoustic impedance, region 3 is medium high acoustic impedance and region 4 is high acoustic impedance. It is then determined, either visually, or by numerical calculation, in which of the lithology classes each of the seismic Kohonen class data points is predominantly located, and each of the Kohonen classes is assigned a corresponding lithology class as so determined. FIG. 12A shows a plot of seismic Kohonen classes in conjunction with a plot of volume shale. FIG. 12B shows a plot of the resulting 12 lithology classes plotted in conjunction with a plot of volume shale. Such plots may assist the analyst in rejecting data locations which appear to be noisy and improve the assignment of Kohonen classes to lithology classes.

Figure 13:
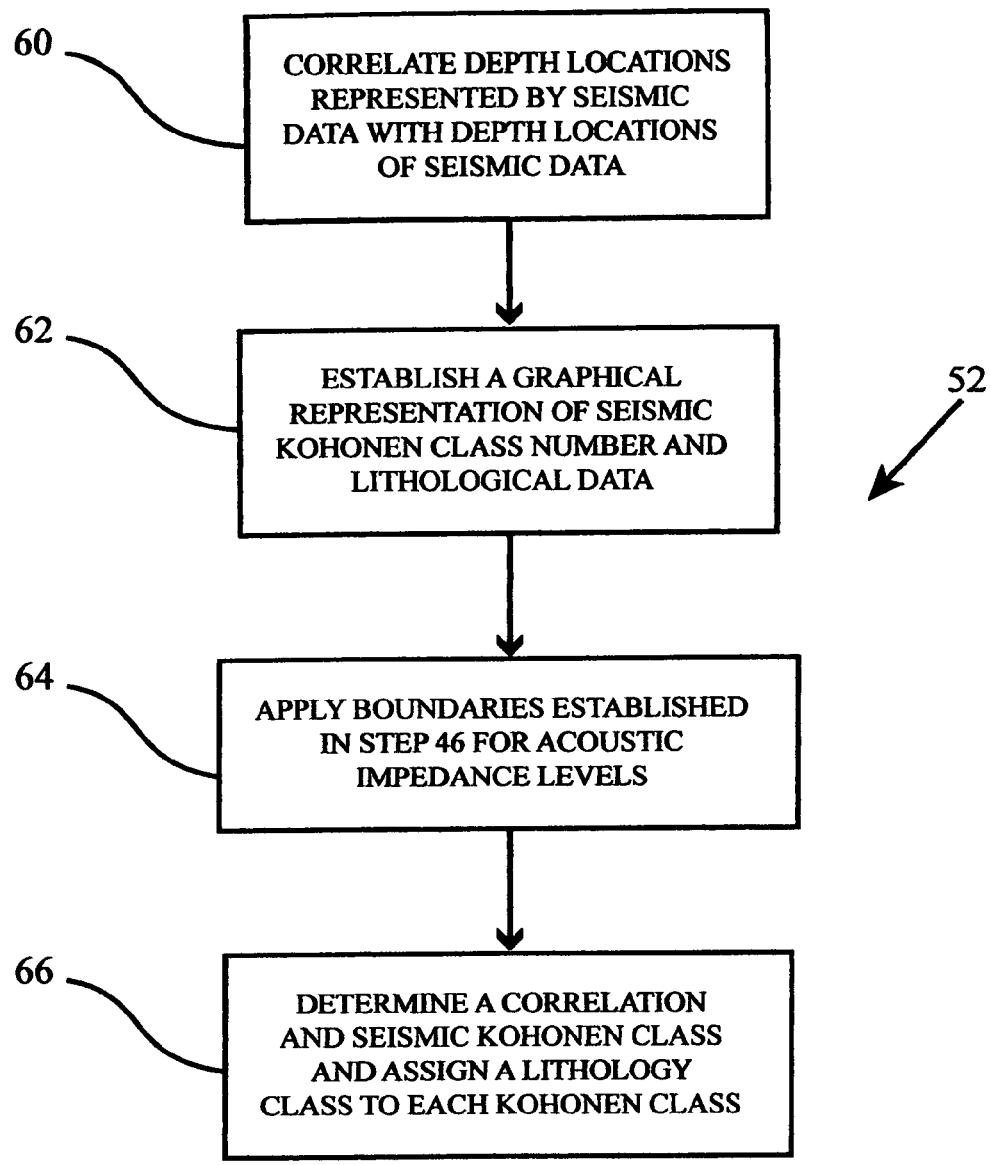
FIG. 13 is a flow chart showing the performance of step 52 in more detail.

The high, medium high, medium low and low boundaries of acoustic impedance developed in step 46 are utilized in step 64 (FIG. 13) in the plot of seismic data Kohonen classes.

In this second embodiment of the invention, just as in the first embodiment, in step 48, seismic attribute data from the subsurface region of interest are applied to a Kohonen neural network. Note that step 48 is similar to step 20. This seismic attribute data are calculated from recorded seismic data traces from the subsurface region of interest, such as the seismic data traces illustrated in FIG. 3.

The seismic attribute data, which will include a plurality of seismic attributes at each measurement location, will represent a point in n-dimensional space. In step 50, a seismic Kohonen class number is assigned to each measurement location. The Kohonen neural network positions a selected number of nodes within this n-dimensional space at positions to achieve the best clustering of the seismic data measurement locations about the node positions. The number of nodes supplied to the network may be 100 nodes, and the network may be regarded as a 10×10 matrix. The node number that each measurement location is closest to is then assigned to the measurement location. This number will be referred to as the seismic data Kohonen class number.

To calibrate the seismic Kohonen classes to lithology classes, in step 52, the Kohonen classes for a seismic data trace from the vicinity of a well bore penetrating the subsurface region of interest is correlated to lithology classes based on lithology data from the well bore. Typically, the number of lithology classes will be fewer than the number of Kohonen classes. The chosen lithology classes may be the twelve lithology classes described above, which are a function of acoustic impedance levels and volume shale levels.

As stated above, FIG. 4 illustrates data from a well, including volume shale and acoustic impedance. Steps for performing step 52 are shown in more detail in FIG. 13. In order to correlate the Kohonen classes to lithology classes, in step 60, the depth locations represented by the seismic data are correlated with depth locations of the well data. In step 62, the correlation of the Kohonen classes to lithology classes may be performed by establishing a graphical representation of seismic Kohonen class number and lithological data. In a particular implementation, a graphical representation is established in which the ordinate represents Kohonen class numbers and the abscissa represent acoustic impedance. For each seismic attribute data location, the value of acoustic impedance at the corresponding well bore location is ascertained and a graphical representation is made for corresponding values of Kohonen class and acoustic impedance. FIG. 6 shows a plot of the relation between Kohonen class and acoustic impedance for a portion of a well bore in which the values of all data points, irrespective of the value for volume shale at that location, is plotted.

In order to correlate the Kohonen classes to the twelve lithology classes referred to above, the shale volume (e.g., whether low, medium or high) for each data measurement location is indicated on the plot of that data measurement location. In one implementation of the invention, illustrated in FIGS. 7A, 7B and 7C, three separate plots are utilized in which low volume shale data locations are plotted on a first plot shown in FIG. 7A, medium volume shale data locations are plotted on a second plot shown in FIG. 7B and high volume shale data locations are plotted on a third plot shown in FIG. 7C. In another implementation all data locations are plotted on the same plot and different colors are used to indicate whether the measurement location was a low, medium or high volume shale location.

Figure 7A:
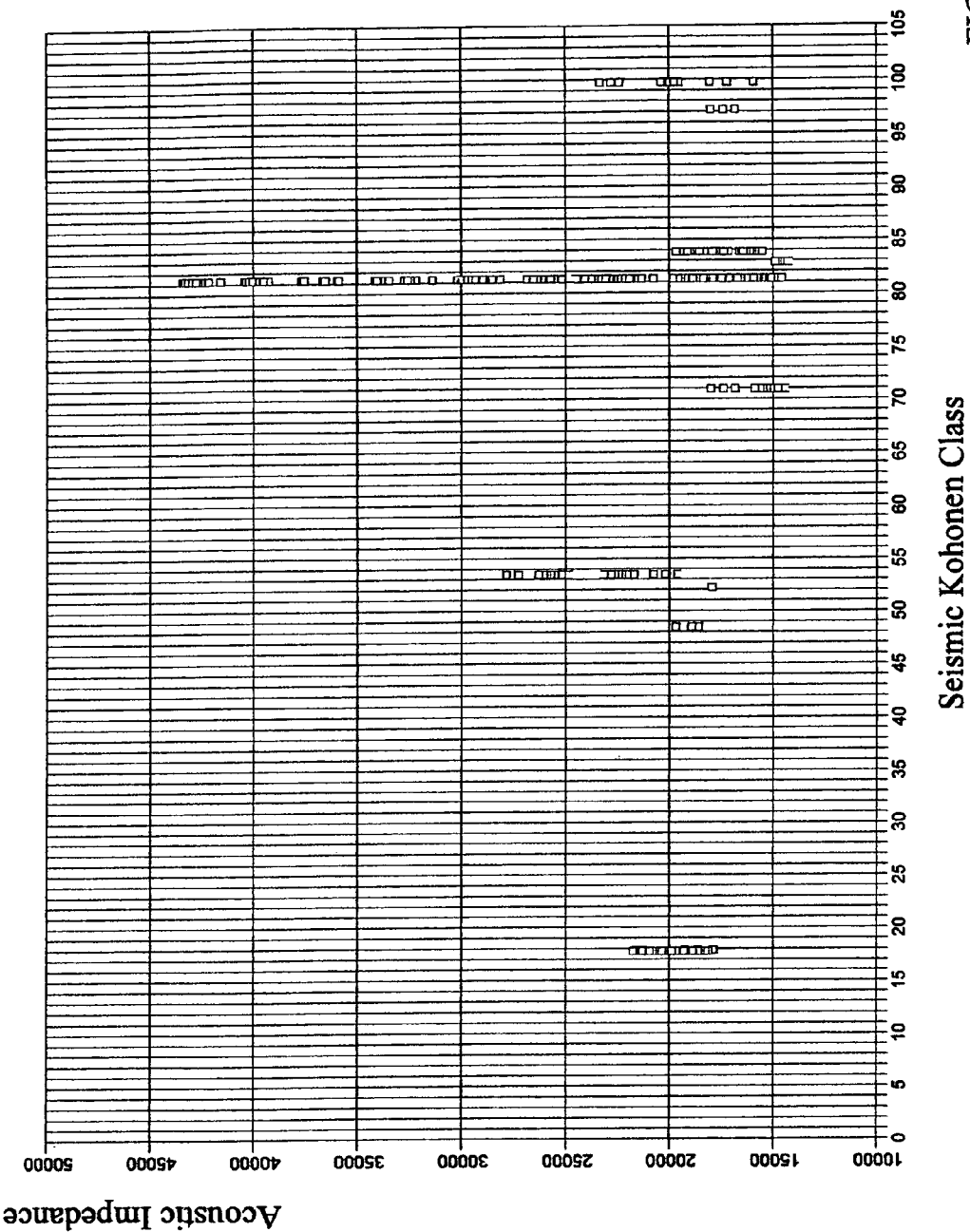
FIGS. 7A, 7B and 7C are plots showing the relation between seismic data Kohonen class and acoustic impedance for low volume shale, medium volume shale and high volume shale, respectively.
Figure 7B:
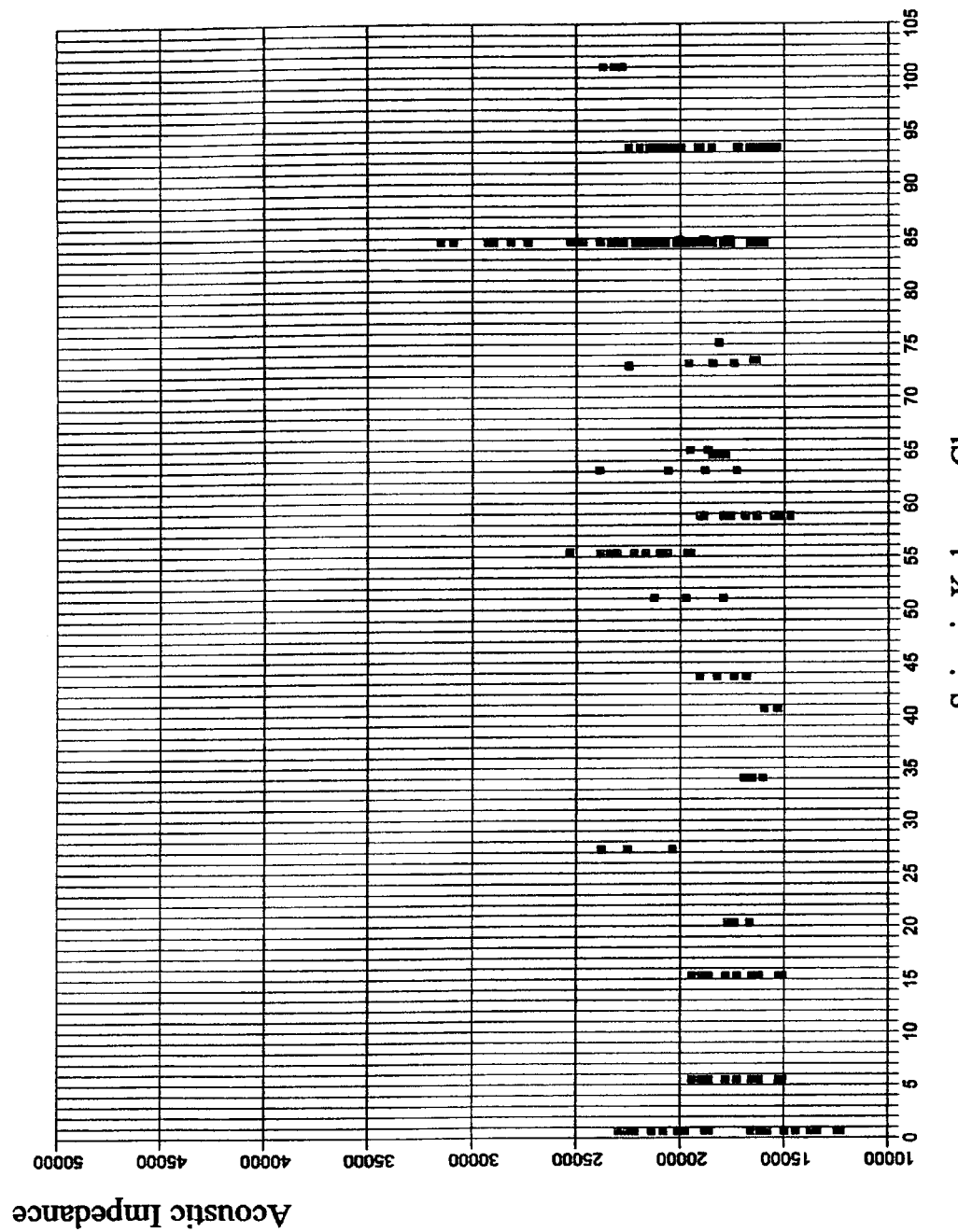
Figure 7C:
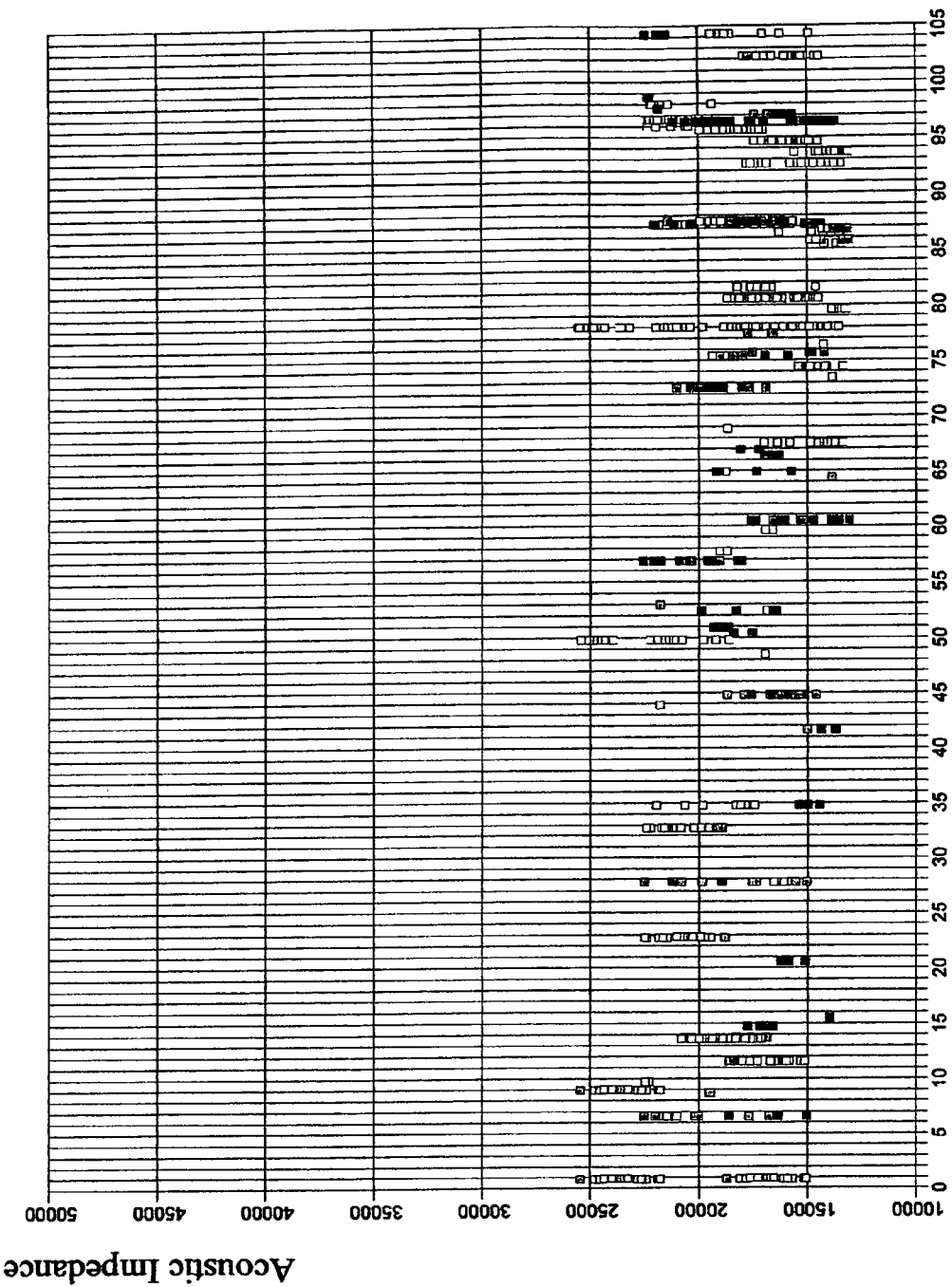

The plot (or plots) is then subdivided into regions of high, medium high, medium low and low values of acoustic impedance, as indicated in FIGS. 7A, 7B and 7C. In this second embodiment of the invention, in step 64, boundaries established with the use of well data as described above with reference to step 46 are utilized as the boundaries between regions of high, medium high, medium low and low values of acoustic impedance. In step 66, it is then determined, either visually, or by numerical calculation, in which of the lithology classes each of the seismic Kohonen class data points is predominantly located, and each of the Kohonen classes is assigned a corresponding lithology class as so determined.

After the correlation is established between Kohonen classes and the lithology classes by use of the training set of seismic attribute data from the seismic trace (or traces) recorded at the location of the well bore, in step 54, this correlation may be applied to the entire seismic data set. Accordingly, a lithology class may be assigned to each data location of the seismic data, and the result may be display or plotted or both. Typically each of the separate lithology classes will be shown as a different color on a display or plot.

Figure 14:
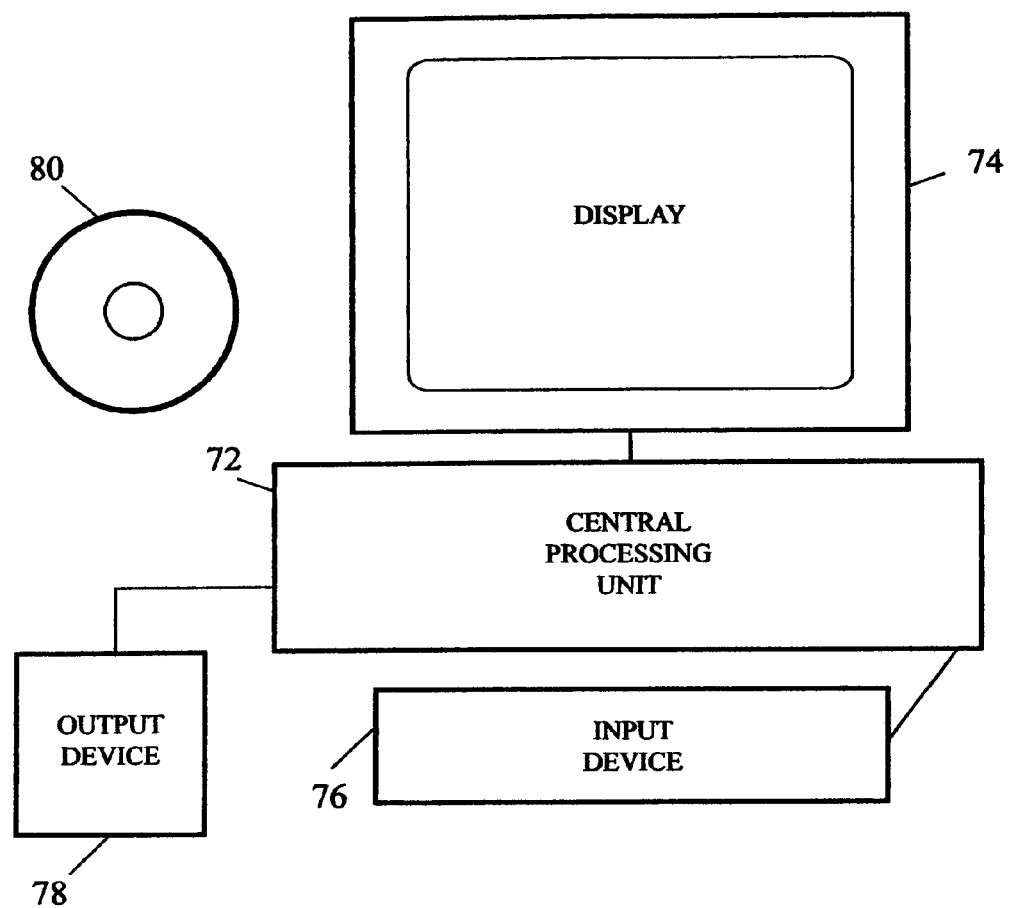
FIG. 14 shows a computer system useful for implementing the invention.

The process of the invention disclosed herein is most conveniently carried out by writing a computer program to carry out the steps described herein on a work station or other conventional digital computer system of a type normally used in the industry. The generation of such a program may be performed by those of ordinary skill in the art based on the processes described herein. Those of ordinary skill in the art will recognize that computer instructions readable by a digital computer and defining the method of the invention will be stored on a storage medium such as magnetic tape, a magnetic or optical disk or an equivalent storage device and will instruct the computer to perform the process. FIG. 14 shows such a conventional computer system comprising a central processing unit 72, a display 74, an input device 76, and an output device 78. The computer program for carrying out the invention will normally reside on a storage media (not shown) associated with the central processing unit. Such computer program may be transported on a CD-ROM or other storage media shown symbolically as storage media 80.

The results of the process of the invention may be displayed with commercially available visualization software. Such software is well known to those of ordinary skill in the art and will not be further described herein. It should be appreciated that the results of the methods of the invention can be displayed, plotted or both.

While the invention has been described and illustrated herein by reference to certain preferred embodiments in relation to the drawings attached hereto, various changes and further modifications, apart from those shown or suggested herein, may be made herein by those skilled in the art. Without departing from the spirit of the invention, the scope of which is defined by the following claims.

We claim:

1. A method of geophysical exploration of a subsurface region of interest, comprising:
    utilizing an unsupervised learning network to organize seismic data representing a subsurface region of interest;
    correlating a portion of said organized seismic data with lithological data from a well bore located in said subsurface region of interest; and
    applying said correlation to said seismic data to estimate lithology in said subsurface region of interest.

2. The method of claim 1 wherein said unsupervised learning network is a self organizing feature map.

3. The method of claim 1 wherein said unsupervised learning network is a Kohonen network.

4. A method of geophysical exploration of a subsurface region of interest, comprising:
    applying a plurality of seismic data attributes for measurement location from a seismic data set from a subsurface region of interest to a Kohonen network to organize said seismic data set into a plurality of seismic Kohonen classes;
    selecting a subset of said organized seismic data set representative of the earth's subsurface in the vicinity of a well bore penetrating said subsurface region of interest;
    correlating Kohonen classes of said subset of said organized seismic data set with classes of lithological data from said well bore to generate a correlation between Kohonen classes and lithological classes; and
    applying said correlation to said seismic data set to estimate lithology of said measurement locations.

5. The method of claim 4 wherein said seismic data attributes comprise semblance, amplitude-versus-offset and attenuation.

6. The method of claim 4 wherein said lithological data comprise volume shale and acoustic impedance.

7. A method of geophysical exploration of a subsurface region of interest, comprising:
    applying a plurality of lithology values for measurement location from a well bore penetrating a subsurface region of interest to a Kohonen neural network to organize said lithology values into a plurality of lithology Kohonen classes;
    utilizing said lithology Kohonen classes to establish ranges of a lithology value;
    applying a plurality of seismic data attributes for measurement location from a seismic data set from said subsurface region of interest to a Kohonen network to organize said seismic data set into a plurality of seismic Kohonen classes;
    selecting a subset of said organized seismic data set representative of the earth's surface in the vicinity of said well bore penetrating said subsurface region of interest;
    correlating Kohonen classes of said subset of said organized seismic data set with classes of lithological data from said well bore to generate a correlation between Kohonen classes and lithological classes, wherein said ranges of a lithology value are utilized in establishing boundaries of said lithology classes; and applying said correlation to said seismic data set to estimate lithology of said measurement locations from said subsurface region of interest.

8. The method of claim 7 wherein said lithology values are volume shale and acoustic impedance.

9. The method of claim 7 wherein said seismic data attributes comprise semblance, amplitude-versus-offset and attenuation.

10. A device which is readable by a digital computer having instructions defining the following process and instructions to the computer to perform said process:

utilizing an unsupervised learning network to organize seismic data representing a subsurface region of interest;

correlating a portion of said organized seismic data with lithological data from a well bore located in said subsurface region of interest; and applying said correlation to said seismic data to estimate lithology in said subsurface region of interest.

11. A device which is readable by a digital computer having instructions defining the following process and instructions to the computer to perform said process:

applying a plurality of seismic data attributes for measurement location from a seismic data set from a subsurface region of interest to a Kohonen network to organize said seismic data set into a plurality of seismic Kohonen classes;

selecting a subset of said organized seismic data set representative of the earth's subsurface in the vicinity of a well bore penetrating said subsurface region of interest;

correlating Kohonen classes of said subset of said organized seismic data set with classes of lithological data from said well bore to generate a correlation between Kohonen classes and lithological classes; and applying said correlation to said seismic data set to estimate lithology of said measurement locations.

12. A device which is readable by a digital computer having instructions defining the following process and instructions to the computer to perform said process:

applying a plurality of lithology values for measurement location from a well bore penetrating a subsurface region of interest to a Kohonen neural network to organize said lithology values into a plurality of lithology Kohonen classes;

utilizing said lithology Kohonen classes to establish ranges of a lithology value;

applying a plurality of seismic data attributes for measurement location from a seismic data set from said subsurface region of interest to a Kohonen network to organize said seismic data set into a plurality of seismic Kohonen classes;

selecting a subset of said organized seismic data set representative of the earth's surface in the vicinity of said well bore penetrating said subsurface region of interest;

correlating Kohonen classes of said subset of said organized seismic data set with classes of lithological data from said well bore to generate a correlation between Kohonen classes and lithological classes, wherein said ranges of a lithology value are utilized in establishing boundaries of said lithology classes; and applying said correlation to said seismic data set to estimate lithology of said measurement locations from said subsurface region of interest.

* * * * *